United States Patent
Azegami et al.

(10) Patent No.: US 10,164,741 B2
(45) Date of Patent: Dec. 25, 2018

(54) PACKET DATA TRANSMISSION DEVICE AND PACKET DATA TRANSMISSION METHOD

(71) Applicant: KOWA COMPANY, LTD., Aichi (JP)

(72) Inventors: Tomohisa Azegami, Saitama (JP); Tatsuya Kimbara, Saitama (JP); Masatomo Ohmaki, Kanagawa (JP)

(73) Assignee: KOWA COMPANY, LTD., Aichi (JP)

( * ) Notice: Subject to any disclaimer, the term of this patent is extended or adjusted under 35 U.S.C. 154(b) by 86 days.

(21) Appl. No.: 15/521,930

(22) PCT Filed: Oct. 21, 2015

(86) PCT No.: PCT/JP2015/079716
§ 371 (c)(1),
(2) Date: Apr. 26, 2017

(87) PCT Pub. No.: WO2016/067999
PCT Pub. Date: May 6, 2016

(65) Prior Publication Data
US 2017/0338909 A1 Nov. 23, 2017

(30) Foreign Application Priority Data
Oct. 30, 2014 (JP) .................. 2014-221264

(51) Int. Cl.
*H04L 12/26* (2006.01)
*H04L 1/08* (2006.01)
(Continued)

(52) U.S. Cl.
CPC ............ *H04L 1/08* (2013.01); *H04B 17/309* (2015.01); *H04L 1/00* (2013.01); *H04L 1/0006* (2013.01)

(58) Field of Classification Search
CPC ....... H04B 17/309; H04L 1/00; H04L 1/0006; H04L 1/08
See application file for complete search history.

(56) References Cited

U.S. PATENT DOCUMENTS

| 7,139,257 | B2 | 11/2006 | Kuo | |
|---|---|---|---|---|
| 2010/0232503 | A1* | 9/2010 | Morimoto | ............ H04W 76/12 375/240.13 |
| 2011/0222431 | A1* | 9/2011 | Oue | .................... H04L 43/0852 370/252 |

FOREIGN PATENT DOCUMENTS

| JP | 2001-111576 | 4/2001 |
|---|---|---|
| JP | 2003-152821 | 5/2003 |
| JP | 2014-158178 | 8/2014 |

OTHER PUBLICATIONS

Written Opinion dated Dec. 8, 2015 for corresponding PCT Application No. PCT/JP2015/079716.

* cited by examiner

*Primary Examiner* — Minh Trang T Nguyen
(74) *Attorney, Agent, or Firm* — Duane Morris LLP

(57) ABSTRACT

[Problem]
To prevent either of two packet data having the same content from being affected by noise
[Solution]
A packet data transmission device (not shown) transmits first packet data 1A, . . . and second packet data 1B, . . . having the same content intermittently with an idle time I therebetween. When the length of the first and second packet data 1A, . . . , 1B, . . . is denoted by $L_P$, the length of the idle time I is denoted by $L_I$, the duration of low-frequency noise N is denoted by $L_N$, the time with no low-frequency noise from the occurrence of one low-frequency noise N to the occurrence of the next low-frequency noise N is denoted by $L_C$, the following expressions (1), (2) are satisfied. Conse- (Continued)

quently, either the first packet data or the second packet data is transmitted to a receiver without being affected by noise.

$$L_I > L_N \tag{1}$$

$$2 \times L_P + L_I < L_C \tag{2}$$

12 Claims, 4 Drawing Sheets

(51) Int. Cl.
    *H04L 1/00*         (2006.01)
    *H04B 17/309*     (2015.01)

PACKET DATA TRANSMISSION DEVICE AND PACKET DATA TRANSMISSION METHOD

CROSS-REFERENCE TO RELATED PATENT APPLICATIONS

The present application is a U.S. national stage application under 35 U.S.C. § 371 of PCT Application No. PCT/JP2015/79716, filed Oct. 21, 2015, which claims priority to Japanese patent application No. JP2014-221264 filed on Oct. 30, 2014.

TECHNICAL FIELD

This invention relates to a packet data transmission device for transmitting a plurality of packet data and a packet data transmission method.

BACKGROUND ART

Conventionally, various kinds of data communication standards of a digital camera for industrial use have been established (see Non-patent related document 1, for instance), and have their own characteristics and problems.

For instance, "CameraLink (registered trademark) standard" transmits 2 Gbps image data, conducts camera control, communicates and supplies power with one cable, but has such problems that the cable is expensive and a data transmission available distance (maximum cable length) is short, such as 10 m or so.

And, "GigE Vision (registered trademark) standard" realizes longer data transmission available distance of 100 m or so with a twisted pair cable, but is vulnerable to electric noise even when a shielded twisted pair cable is used.

Furthermore, "CoaXPress standard" that has been released on December 2010 enables data transmission up to 6.25 Gbps, output of camera control signals up to 20.8 Mbps, and 13 W power supply with one coaxial cable. In such a standard, data transmission available distance is 100 m or more in 1.25 Gbps, and noise resistance is higher than the twisted pair cable since the coaxial cable is used. But, this standard is not able to endure ±2 kV burst noise or so with a thin 3CFB or so. Although an error can be avoided against ±2 kV noise if a thick 7CFB cable is used, such a thick cable is expensive and working efforts for laying the cable are required.

Moreover, in a general data interface standard "USB3.0 standard", the maximum data transmission speed is high, 5 Gbps, and the data transmission available distance is short, 5 m or or.

PRIOR ART

Patent Related Document

Patent related document 1: Official gazette of Japanese patent application publication No. H7-15412

Non-Patent Related Document

Non-Patent related document 1: "Interface standard for Machine vision" published on January 2014, Japan Industrial Imaging Association [retrieved on Oct. 15, 2014], Internet <http://jiia.org/wp-content/themes/jiia/pdf/fsf-.pdf>

SUMMARY OF INVENTION

Problems to be Solved by Invention

In some cases, it is necessary to transmit data from an industrial digital camera a long distance. When a machine vision is constituted by attaching an industrial digital camera to industrial robots or various kinds of inspection equipment, for instance, it is necessary to transmit data from a production line of a factory a long distance. In such a case, the above-mentioned USB3.0 standard or the CameraLink standard cannot be used because the transmission distance is short for those standards.

On the contrary, the above-mentioned GigE Vision standard and the CoaXPress standard have problems with regard to noise resistance although both have no problems with regard to long distance transmissions. In the GigE Vision standard, a retransmission mechanism is enabled when the transmitted data is corrupted due to noise. Such a standard, however, is not suitable where real-time property is required, as with the above-mentioned machine vision application, since it takes longer time for the data retransmission. Another problem with the CoaXPress standard is that it does not have data retransmission mechanism nor a data correction mechanism. Imaging process has to be repeated when an error occurs due to the noise, and for this reason, it is not suitable for use in which real-time property is required.

On the other hand, an invention for securing a real-time property has been proposed (see Patent related document 1, for instance).

FIG. 4 is a block diagram that shows an instance of a configuration of a conventional data broadcast receiver, and the data broadcast receiver 100 is configured to receive data comprised of successive packets a plurality of times. And, a reference number 101 in FIG. 4 denotes a packet error identifying circuit for identifying errors of the packet, and a reference number 102 denotes a majority decision circuit that conducts a majority decision on the packet (one being at a position the same as one in which the error was found) of the packet data transmitted a plurality of times when the packet error identifying circuit 101 found the error in some packet. But, such a data broadcast receiver 100 has such a problem that the packet data should be received at least three times.

That is, a proper communication standard that can be used even under highly noisy conditions, requiring transmission of data a long distance, while ensuring real-time property has not been proposed.

An object of the invention is to provide a packet data transmission device and a packet data transmission method for solving the above-mentioned problems.

Means for Solving Problems

A first aspect of the invention is a packet data transmission device (see the reference number 1 of FIG. 2), exemplarily shown in FIG. 1 for transmitting a plurality of packet data, comprising:

a data transmitter (see the reference number 1*a* of FIG. 2) that intermittently transmits a first packet data (1A, . . . ) and a second packet data (1B, . . . ) having the same content as the first packet data (1A, . . . ) in orders of the first packet data (1A, . . . ) and the second packet data (1B, . . . );

wherein length of the first and second packet data (1A, . . . , 1B, . . . ) is denoted by $L_P$, length of idle time (I) between transmission of the first packet data (1A, . . . ) and transmission of the second packet data (1B, . . . ) is denoted by $L_I$, duration of a noise that is generated at intervals of 10 µsec or more (see the reference number N, "the low-frequency noise" hereinafter) is denoted by $L_N$, duration of time between an occurrence of one low-frequency noise (N) to an occurrence of a next low-frequency noise N ("the time with no noise" hereinafter) is denoted by $L_C$, wherein the following expressions (1) and (2) are satisfied.

$$L_I > L_N \quad (1)$$

$$2 \times L_P + L_I < L_C \quad (2).$$

A second aspect of the invention is the packet data transmission device, wherein the time with no noise $L_C$ is 10 µsec or more and 200 µsec or less, wherein the packet data transmission device transmits the first and second packet data (1A, ..., 1B, ...) is 1.25 Gbps or more and 6.25 Gbps or less, wherein each of the first and second packet data (1A, ..., 1B, ...) is 1 word or more and 560 words or less, and the length of the idle time (I) is 10 words or more and 100 words or less.

The third aspect of the invention is the packet data transmission device, wherein the time with no noise $L_C$ is 10 µsec or so, wherein the packet data transmission device transmits the first and second packet data (1A, ..., 1B, ...) at transmission speed of 1.25 Gbps, wherein each of the first and second packet data (1A, ..., 1B, ...) is 64 words or more and 112 words or less, and the idle time (I) is 10 words or so in length.

The fourth aspect of the invention is the packet data transmission device, wherein redundant encoding is conducted on the first and second packet data (1A, ..., 1B, ...).

The fifth aspect of the invention is a packet data transmission method of transmitting a plurality packet data, comprising:

a step of intermittently transmitting a first packet data (1A, ...) and a second packet data (1B, ...) having the same content as the first packet data (1A, ...) in orders of the first packet data (1A, ...) and the second packet data (1B, ...);

wherein length of the first and second packet data (1A, ..., 1B, ...) is denoted by $L_P$, length of idle time (I) between transmission of the first packet data (1A, ...) and transmission of the second packet data (1B, ...) is denoted by $L_I$, duration of a noise that is generated at intervals of 10 µsec or more (see the reference number N, "the low-frequency noise" hereinafter) is denoted by $L_N$, when duration of time between an occurrence of one low-frequency noise (N) to an occurrence of a next low-frequency noise (N) ("the time with no noise" hereinafter) is denoted by $L_C$, the following expressions (3), (4) are satisfied.

$$L_I > L_N \quad (3)$$

$$2 \times L_P + L_I < L_C \quad (4)$$

The sixth aspect of the invention is the packet data transmission method, wherein the time with no noise $L_C$ is 10 µsec or more and 200 µsec or less, wherein the first and second packet data (1A, ..., 1B, ...) are transmitted at speed of 1.25 Gbps or more and 6.25 Gbps or less, the first and second packet data (1A, ..., 1B, ...) is 1 word or more and 560 words or less, and the idle time (I) is 10 words or more and 100 words or less in length.

The seventh aspect of the invention is the packet data transmission method, wherein the time with no noise $L_C$ is 10 µsec or so, the first and second packet data (1A, ..., 1B, ...) are transmitted at speed of 1.25 Gbps, wherein each of the size of the first and second packet data (1A, ..., 1B, ...) is 64 words or more and 112 words or less, and the idle time (I) is 10 words or so in length.

The eighth aspect of the invention is the packet data transmission method, wherein redundant encoding is conducted on the first and second packet data (1A, ..., 1B, ...).

The number in parentheses shows the corresponding element in the drawings for the sake of convenience, accordingly, the descriptions are not restricted and bound by the descriptions on the drawings.

Effects of Invention

According to the invention, either the first packet data or the second packet data that are sequentially transmitted, having the same content is transmitted to a packet data receiver without being affected by the low-frequency noise that generates at intervals 10 µsec or so. Consequently, it is possible to use the packet data transmission device 1 according to the invention with a thin transmission cable, such as 3CFB even in an environment where many low-frequency noises N are generated, being caused by a power source. For instance, it is possible to constitute a machine vision by attaching an industrial digital camera to an industrial robot or various kinds of inspection equipment.

According to the invention, it is not necessary for the packet data transmission device to retransmit the packet data even if the packet data is affected by the high-frequency noise whose occurrence interval is shorter than 10 µsec, and the packet data receiver obtains normal data. Consequently, a delay due to the retransmission of packet data does not occur, and it is effective for random noise that occurs sporadically.

EMBODIMENTS FOR CARRYING OUT THE INVENTION

Figure 1:
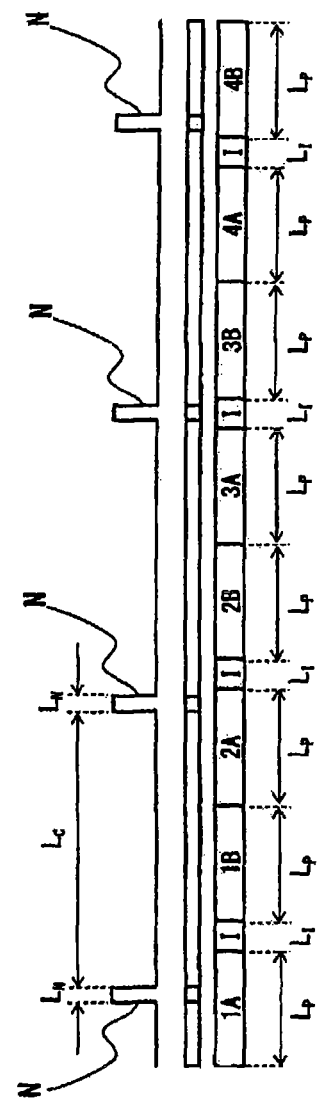
FIG. 1 is a view that shows a data structure for explaining packet data and the like that are transmitted with a packet data transmission device through a packet data transmission method according to the invention.
Figure 2:
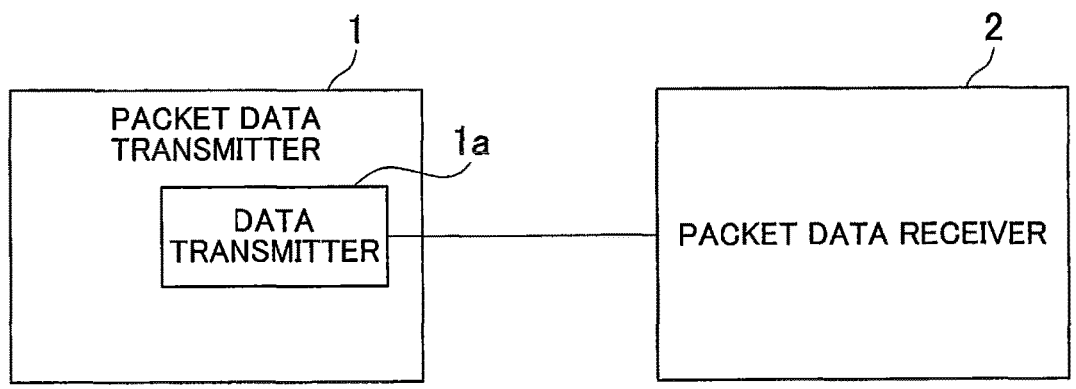
FIG. 2 is a block diagram that shows an instance of a structure of the packet data transmission device according to the invention and an instance of its used state.
Figure 3:
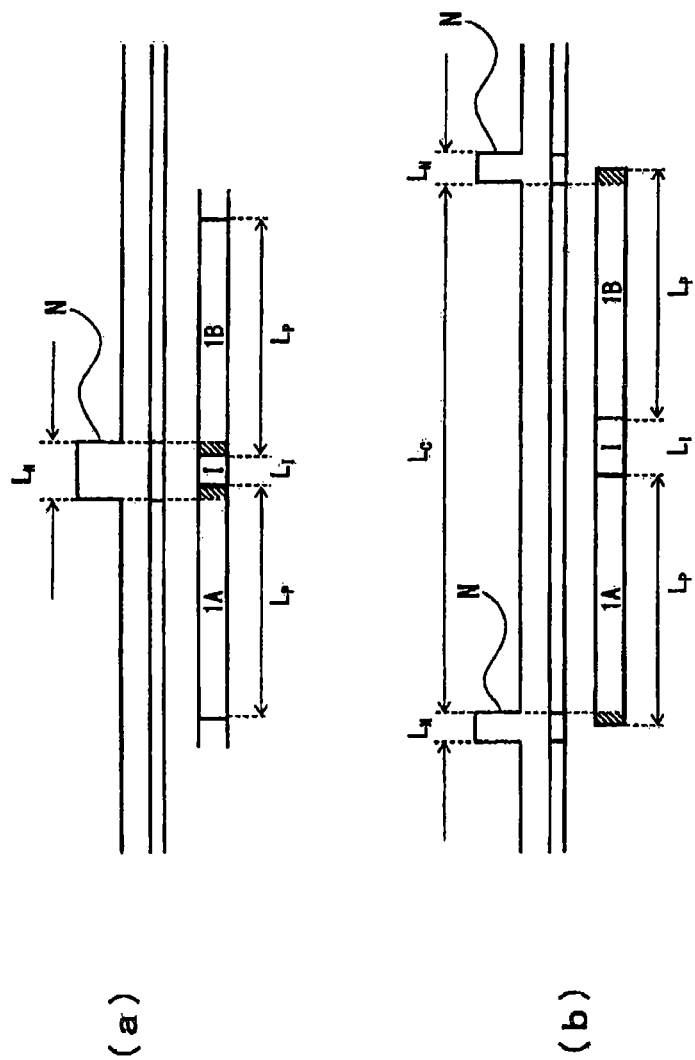
FIGS. 3(a) and (b) are views each shows the data structure for explaining effects of the invention.
Figure 4:
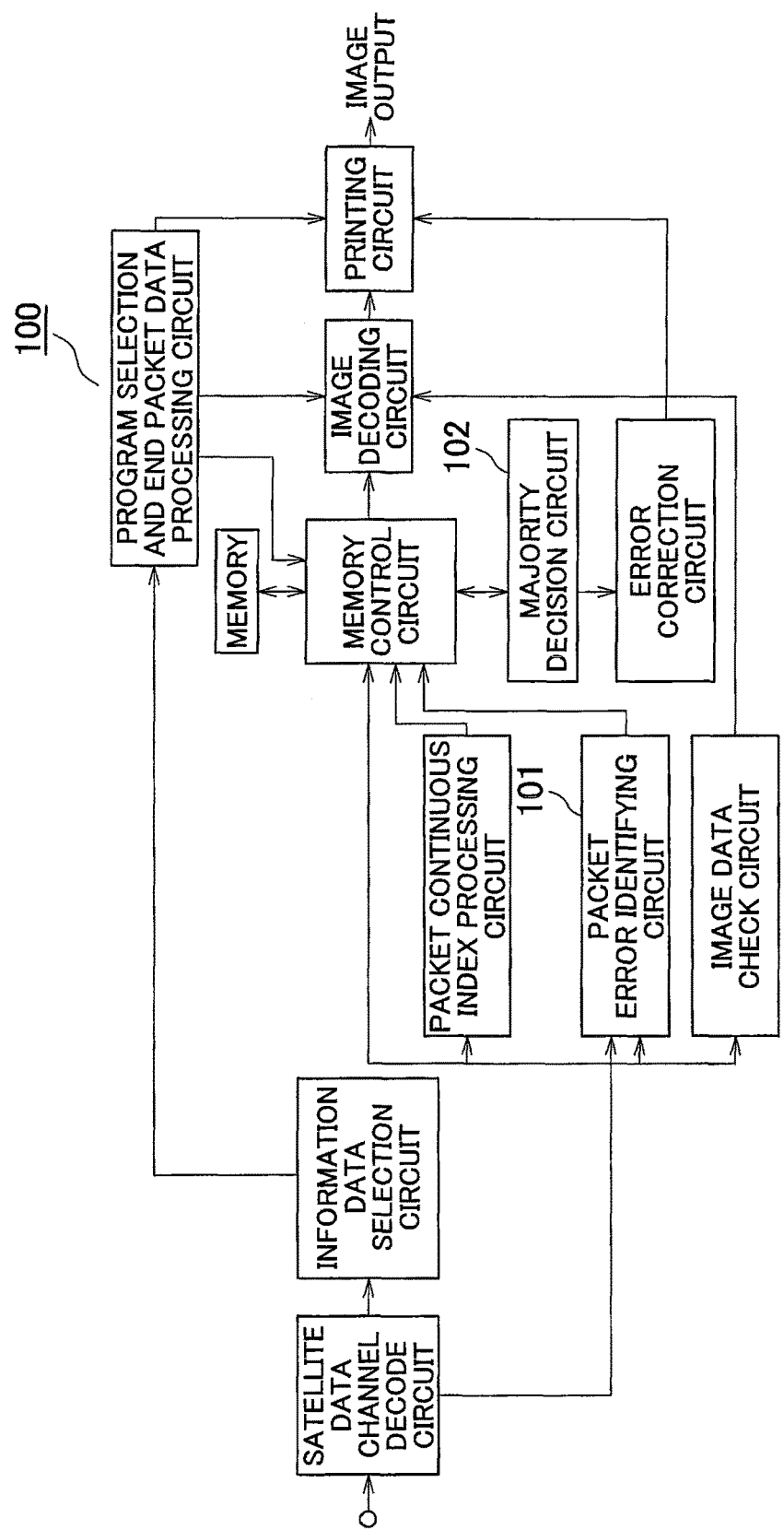
FIG. 4 is a block diagram that shows an instance of a structure of a conventional data broadcast receiver.

Embodiments of the invention are mentioned, referring to appended drawings FIGS. 1 to 3.

A packet data transmission device 1 according to the invention transmits a plurality of packet data, and as exemplarily shown in FIG. 1, it has a data transmitter (see a reference number 1a of FIG. 2) that intermittently transmits two packet data having the same content, such as two packet data 1A, 1B and two packet data 2A and 2B. In this case, "intermittently" means having idle time I between two packet data.

In the specification, the packet data 1A, 2A, 3A, ... of the two packets having the same content that are firstly transmitted are "first packet data", and the packet data 1B, 2B, 3B, ... having content the same as the first packet data 1A, ... that are transmitted subsequent to the first packet data 1A, . . . are "second packet data". That is, a first pair of the first packet data "1A" and the second packet data "1B" have the same content, a second pair of the first packet data "2A" and the second packet data "2B" have the same content, and a third pair of the first packet data "3A" and the second packet data "3B" have the same content.

When length of the first and second packet data 1A, . . . , 1B, . . . is denoted by $L_P$, length of idle time I between the transmission of the first packet data 1A, . . . and the transmission of the second packet data 1B, . . . is denoted by $L_I$, duration of noise N that is generated at intervals of 10 μsec or more (±2 to 3 kV or so, that is, high burst noise up to ±4 kV, "the low-frequency noise" hereinafter) is denoted by $L_N$, duration of time between an occurrence of one low-frequency noise N to an occurrence of a next low-frequency noise N ("the time with no noise") is denoted by $L_C$, the following expressions (1), (2) are satisfied in the packet data transmission device 1.

$$L_I > L_N \quad (5)$$

$$2 \times L_P + L_I < L_C \quad (6).$$

If the expression (5) is not satisfied, the first and second packet data 1A, 1B may be affected by the same low-frequency noise N, as exemplarily shown with an oblique line portion in FIG. 3(a). Besides, if the expression (6) is not satisfied, the first and second packet data 1A, 1B may be affected by separate low-frequency noise because both are too long, as exemplarily shown with an oblique line portion in FIG. 3(b). But, it is possible to avoid these situations according to the invention.

Preferably, the length $L_P$ of one packet data 1A, . . . is shorter than "5 μsec–$L_I$/2" since the time with no noise $L_C$ of the low-frequency noise N is 10 μsec or so. For instance, if transmission speed of the first and second packet data 1A, . . . 1B, . . . is 1.25 Gbps, size of one packet data 1A, . . . , 1B, . . . may be 64 words or more and 112 words or less, and the length of the idle time $L_I$ may be 10 words or so. In the invention, one word of 4 bytes equal 32 bits, but the actual transmission length (length at the time of transmission) is 40 bits due to 10 b/8 b conversion. According to an experiment conducted on influence of the noise, if the low-frequency noise ±4 kV is given to 40 m 3CFB cable in addition to the above-mentioned conditions, the length is up to 36 bytes or so. Such a length varies, depending on the transmission speed, the length of the cable, the thickness of the cable and noise voltage.

Preferably, the time with no noise $L_C$ is 10 μsec or more and 200 μsec or less, the packet data transmission device 1 transmits the first and second packet data 1A, . . . , 1B, . . . at transmission speed of 1.25 Gbps or more and 6.25 Gbps or less, each of the size of the first and second packet data 1A, . . . , 1B, . . . is 1 word or more and 560 words or less, and the length of the idle time I is 10 words or more and 100 words or less.

According to the invention, either the first packet data 1A or the second packet data 1B that are sequentially transmitted, having the same content is transmitted to a packet data receiver (see a reference number 2 of FIG. 2) without being affected by the low-frequency noise N. Consequently, it is possible to use the packet data transmission device 1 according to the invention even with a thin transmission cable, such as 3CFB even in an environment where many low-frequency noises N generates, being caused by a power source. For instance, it is possible to constitute a machine vision by attaching an industrial digital camera to an industrial robot or various kinds of inspection equipment. In this case, the low-frequency noise N may be one that generates periodically.

It is possible to apply the invention to the CoaXPress standard, and to apply to a type where packetized data is transmitted, such as a type where data is transmitted with the Ethernet cable (registered trademark) and a USB, as well as the CoaXPress standard. The usable band becomes narrow by transmitting the packet data 1A, 1B having the same content twice, but the CoaXPress standard is able to sufficiently achieve 200 Mbps that is a target since it has a band 1.25 Gbps to 6.125 Gbps. In the CoaXPress standard, CRC (Cyclic Redundancy Check wherein it is possible to detect data error, but not possible to restore the data) code is attached to the packetized data, and it is possible to carry out CRC check if the data is garbled in order to detect the garbled data. Then, it is sufficient to elect the packet data correctly transmitted. It is necessary to add the above-mentioned CRC code or a code for detecting errors as the CRC code to the packet data even if the invention is applied to the other standard excluding the CoaXPress standard.

Preferably, in the invention, redundant encoding (redundant encoding by REED-SOLOMON) is conducted on each packet data 1A, 1B, . . . and FEC (Forward Error Correction) is conducted on the packet data affected by the noise on the packet data receiver 2 side. For instance, when conducting redundancy encoding on the data of 256 bytes in order to expand to 272 bytes, it is possible to correct the errors up to 8 bytes. By doing so, it is not necessary for the packet data transmission device 1 to retransmit the packet data even if the packet data is affected by the noise excluding the low-frequency noise caused by the power source as mentioned before, such as high-frequency noise which occurrence interval is shorter than 10 μsec, and the packet data receiver 2 obtains normal data. Consequently, a delay due to the retransmission of packet data does not occur, and it is effective for random noise that occurs sporadically.

That is, in this invention, the influence of the low-frequency noise N through which garbled data successively generates at low frequency is avoided by transmitting the packet data 1A, 1B, . . . having the same content as shown in FIG. 1, and the influence of the high-frequency noise (random noise) that sporadically generates at higher frequency rather than the low-frequency noise (burst noise) N is avoided by the above-mentioned FEC. If the resistance to the burst noise or the random noise is materialized in the CoaXPress standard, it is considerably ideal as the interface of the digital camera that is attached to the industrial robot or the like.

A method of transmitting the packet data according to the invention transmits a plurality of packet data, and has a step of transmitting the first packet data 1A, . . . and the second packet data 1B, . . . having the same content as the first packet data 1A in orders of the first packet data 1A and the second packet data 1B, and the next first packet data 2A and the next packet data 2B . . . . In this case, the first packet data 1A, the second packet data 1B, and the next first packet data 2A and the next second packet data 2B are intermittently transmitted.

When length of the first and second packet data 1A, . . . 1B, . . . is denoted by $L_P$, length of idle time between the transmission of the first packet data 1A, . . . and the transmission of the second packet data 1B, . . . is denoted by $L_I$, duration of a low-frequency noise N is denoted by $L_N$, time with no noise is denoted by $L_C$, the following expressions (7), (8) are satisfied.

$$L_I > L_N \quad (7)$$

$$2 \times L_P + L_I < L_C \quad (8)$$

Preferably, the length $L_P$ of one packet data 1A, ... is shorter than "5 μsec−$L_I$/2" since the time with no noise $L_C$ of the low-frequency noise N (±2 to 3 kV or so, that is, high burst noise up to ±4 kV or so) is 10 μsec or so. For instance, if transmission speed of the first and second packet data 1A, ..., 1B, ... is 1.25 Gbps, size of one packet data 1A, ..., 1B, ... may be 64 words or more and 112 words or less, and the length of the idle time $L_I$ may be 10 words or so.

Preferably, the time with no noise $L_C$ is 10 μsec or more and 200 μsec or less, the transmission speed of the first and second packet data 1A, ... 1B, ... is 1.25 Gbps or more and 6.25 Gbps or less, the size of the first and second packet data 1A, ... 1B, ... is 1 word or more and 560 words or less, and the length of the idle time I is 10 words or more and 100 words or less.

Preferably, the redundant encoding (redundant encoding by REED-SOLOMON) is conducted on each packet data 1A, 1B, . . . and FEC (Forward Error Correction) is conducted on the packet data affected by the noise on the packet data receiver 2 side.

EXPLANATION OF REFERENCE NUMBERS

1 . . . Packet data transmission device
1a . . . Data transmitter
1A, . . . first packet data
1B, . . . second packet data
$L_C$ . . . time with no noise
$L_I$ . . . length of idle time
$L_N$ . . . Duration of low-frequency noise
$L_P$ . . . length of first and second packet data
N . . . Low-frequency noise

The invention claimed is:

1. A packet data transmission device for transmitting a plurality of packet data, comprising:
a data transmitter that intermittently transmits a first packet data and a second packet data having same content as the first packet data in orders of the first packet data and the second packet data;
wherein length of the first and second packet data is denoted by $L_P$,
wherein length of idle time between transmission of the first packet data and transmission of the second packet data is denoted by $L_I$,
wherein duration of a low-frequency noise that is generated at intervals of 10 μsec or more is denoted by $L_N$,
wherein duration of time with no noise between an occurrence of one low-frequency noise to an occurrence of a next low-frequency noise is denoted by $L_C$,
wherein the following expressions (1) and (2) are satisfied:

$$L_I > L_N \quad (1),$$

$$2 \times L_P + L_I < L_C \quad (2).$$

2. The packet data transmission device according to claim 1, wherein the time with no noise $L_C$ is 10 μsec or more and 200 μsec or less, wherein the packet data transmission device transmits the first and second packet data at transmission speed of 1.25 Gbps or more and 6.25 Gbps or less, and
wherein each of the first and second packet data is 1 word or more and 560 words or less, and the length of the idle time is 10 words or more and 100 words or less.

3. The packet data transmission device according to claim 2, wherein redundant encoding is conducted on the first and second packet data.

4. The packet data transmission device according to claim 1, wherein the time with no noise $L_C$ is 10 μsec, wherein the packet data transmission device transmits the first and second packet data at transmission speed of 1.25 Gbps, and
wherein each of the first and second packet data is 64 words or more and 112 words or less, and the idle time is 10 words in length.

5. The packet data transmission device according to claim 4, wherein redundant encoding is conducted on the first and second packet data.

6. The packet data transmission device according to claim 1, wherein redundant encoding is conducted on the first and second packet data.

7. A packet data transmission method of transmitting a plurality packet data, comprising:
intermittently transmitting a first packet data and a second packet data having same content as the first packet data in orders of the first packet data and the second packet data;
wherein length of the first and second packet data is denoted by $L_P$,
wherein length of idle time between transmission of the first packet data and transmission of the second packet data is denoted by $L_I$,
wherein duration of a low-frequency noise that is generated at intervals of 10 μsec or more is denoted by $L_N$,
wherein duration of time with no noise between an occurrence of one low-frequency noise to an occurrence of a next low-frequency noise is denoted by $L_C$,
wherein the following expressions (3) and (4) are satisfied:

$$L_I > L_N \quad (3),$$

$$2 \times L_P + L_I < L_C \quad (4).$$

8. The packet data transmission method according to claim 7, wherein the time with no noise $L_C$ is 10 μsec or more and 200 μsec or less,
wherein the first and second packet data are transmitted at speed of 1.25 Gbps or more and 6.25 Gbps or less, and
wherein the first and second packet data is 1 word or more and 560 words or less, and the idle time is 10 words or more and 100 words or less in length.

9. The packet data transmission method according to claim 8, wherein redundant encoding is conducted on the first and second packet data.

10. The packet data transmission method according to claim 7, wherein the time with no noise $L_C$ is 10 μsec,
wherein the first and second packet data are transmitted at speed of 1.25 Gbps, and
wherein each of the first and second packet data is 64 words or more and 112 words or less, and the idle time is 10 words in length.

11. The packet data transmission method according to claim 10, wherein redundant encoding is conducted on the first and second packet data.

12. The packet data transmission method according to claim 7, wherein redundant encoding is conducted on the first and second packet data.

* * * * *